(12) United States Patent
Ovalle

(10) Patent No.: US 10,286,637 B2
(45) Date of Patent: May 14, 2019

(54) ADHESIVE SHEET

(71) Applicants: LINTEC OF AMERICA, INC., Phoenix, AZ (US); LINTEC CORPORATION, Tokyo (JP)

(72) Inventor: Raquel Ovalle, Phoenix, AZ (US)

(73) Assignees: Lintec of America, Inc., Phoenix, AZ (US); Lintec Corporation, Tokyo (JP)

( * ) Notice: Subject to any disclaimer, the term of this patent is extended or adjusted under 35 U.S.C. 154(b) by 0 days.

(21) Appl. No.: 15/552,697

(22) PCT Filed: Feb. 23, 2016

(86) PCT No.: PCT/JP2016/055128
§ 371 (c)(1),
(2) Date: Aug. 22, 2017

(87) PCT Pub. No.: WO2016/136686
PCT Pub. Date: Sep. 1, 2016

(65) Prior Publication Data
US 2018/0043665 A1    Feb. 15, 2018

Related U.S. Application Data

(60) Provisional application No. 62/119,420, filed on Feb. 23, 2015.

(51) Int. Cl.
*B32B 9/00* (2006.01)
*B32B 27/18* (2006.01)
(Continued)

(52) U.S. Cl.
CPC .............. *B32B 27/18* (2013.01); *B32B 9/007* (2013.01); *B32B 27/12* (2013.01); *B32B 27/14* (2013.01);
(Continued)

(58) Field of Classification Search
CPC .................. Y10T 428/30; B82Y 30/00; C01B 31/022–31/0293; C01B 2202/00
(Continued)

(56) References Cited

U.S. PATENT DOCUMENTS

2008/0248235 A1    10/2008    Feng et al.
2008/0308295 A1*   12/2008    Fu .............................. C09J 9/02
                                                              174/117 FF
(Continued)

FOREIGN PATENT DOCUMENTS

CN    101094901 A    12/2007
CN    101239712 A     8/2008
(Continued)

OTHER PUBLICATIONS

English translation of International Preliminary Report on Patentability issued in corresponding International Patent Application No. PCT/JP2016/055128, dated Aug. 29, 2017.
(Continued)

*Primary Examiner* — Daniel H Miller
(74) *Attorney, Agent, or Firm* — McDermott Will & Emery LLP

(57) ABSTRACT

An adhesive sheet includes: a carbon nanotube sheet including a plurality of carbon nanotubes aligned preferentially in one direction within a plane of the sheet; and an adhesive agent layer including an adhesive agent, in which a rupture elongation of the adhesive sheet is 10% or more.

8 Claims, 4 Drawing Sheets

(51) Int. Cl.

| | |
|---|---|
| *B82Y 30/00* | (2011.01) |
| *C09J 7/00* | (2018.01) |
| *B32B 27/12* | (2006.01) |
| *B32B 27/14* | (2006.01) |
| *B32B 27/38* | (2006.01) |
| *C09J 11/04* | (2006.01) |
| *C09J 11/06* | (2006.01) |
| *C09J 163/00* | (2006.01) |

(52) U.S. Cl.
CPC ............... *B82Y 30/00* (2013.01); *C09J 7/00* (2013.01); *B32B 27/38* (2013.01); *B32B 2255/02* (2013.01); *B32B 2255/26* (2013.01); *B32B 2262/106* (2013.01); *B32B 2264/108* (2013.01); *B32B 2305/77* (2013.01); *B32B 2307/50* (2013.01); *B32B 2405/00* (2013.01); *C09J 11/04* (2013.01); *C09J 11/06* (2013.01); *C09J 163/00* (2013.01)

(58) Field of Classification Search
USPC ..................... 428/408; 423/448; 977/742
See application file for complete search history.

(56) References Cited

U.S. PATENT DOCUMENTS

| | | | |
|---|---|---|---|
| 2009/0127712 A1 | 5/2009 | Wyland | |
| 2009/0160795 A1 | 6/2009 | Jiang et al. | |
| 2009/0160798 A1 | 6/2009 | Jiang et al. | |
| 2012/0214936 A1* | 8/2012 | Fujita | C09J 133/04 524/548 |
| 2012/0289112 A1* | 11/2012 | Mao | B82Y 30/00 442/72 |
| 2013/0216811 A1* | 8/2013 | Ghasemi-Nehjad | B82Y 30/00 428/220 |

FOREIGN PATENT DOCUMENTS

| | | |
|---|---|---|
| CN | 101323759 A | 12/2008 |
| CN | 101464764 A | 6/2009 |
| JP | 2008-519122 A | 6/2008 |
| JP | 2008-523254 A | 7/2008 |
| JP | 2009-151783 A | 7/2009 |
| JP | 2011-132387 A | 7/2011 |
| JP | 2012-214586 A | 11/2012 |
| JP | 2013-032430 A | 2/2013 |
| JP | 5255021 B2 | 8/2013 |
| WO | 2011/077784 A1 | 6/2011 |

OTHER PUBLICATIONS

International Search Report issued in Application No. PCT/JP2016/055128 dated May 24, 2016, with English translation.

"Liquid rocket engine special production technique", China Astronautic Publishing House, pp. 293-294, Oct. 2014.

Chinese Office Action issued in corresponding Chinese Patent Application No. 201680011431.5, dated Oct. 9, 2018, with English Translation.

\* cited by examiner

ADHESIVE SHEET

RELATED APPLICATIONS

This application is the U.S. National Phase under 35 U.S.C § 371 of International Application No. PCT/JP2016/055128, filed on Feb. 23, 2016, which in turn claims the benefit U.S. Provisional Application No. 62/119,420, filed Feb. 23, 2015, the disclosures of which are incorporated by reference herein.

TECHNICAL FIELD

The present invention relates to an adhesive sheet.

BACKGROUND ART

Adhesive sheets have long been used for, for instance, packing, sealing, banding, void filling, masking and providing a design. Recently, for instance, adhesive sheets intended to be stuck on a component installed in a small-sized article or to cover a skin wound are sometimes required to be thinned. Examples of Patent Literature 1 disclose an adhesive sheet including a base with a thickness of 6 μm and an adhesive agent layer with a thickness in a range from 2 to 6 μm.

A sheet of carbon nanotubes has been known.

For instance, Patent Literature 2 discloses a nanofiber sheet containing carbon nanotubes.

Further, Patent Literature 3 discloses a carbon nanotube structure including a protection structure, which includes at least one drawn carbon nanotube film, a base and a coating film.

CITATION LIST

Patent Literature(s)

Patent Literature 1: JP-A-2013-032430
Patent Literature 2: JP-A-2008-523254
Patent Literature 3: JP-B-5255021

SUMMARY OF THE INVENTION

Problem(s) to be Solved by the Invention

The thinnest adhesive sheet disclosed in Examples of Patent Literature 1 has a total sheet thickness of 8 μm. However, an adhesive sheet including a thinner base is less strong, and thus is likely to be ruptured, for instance, when pulled, pierced or hit. For instance, when the base is used as a core to prevent a double-sided adhesive sheet from being ruptured, a thickness of an adhesive agent layer may be 10 μm or more and thus the adhesive sheet may be thickened as a whole. However, the base is sometimes required to be thinned in order to minimize an influence of the mechanical properties of the base in a thickness direction.

An object of the invention is to provide a strong adhesive sheet including a thinned base.

Means for Solving the Problem(s)

According to an aspect of the invention, an adhesive sheet includes: a carbon nanotube sheet including a plurality of carbon nanotubes aligned preferentially in one direction within a plane of the sheet; and an adhesive agent layer including an adhesive agent, in which a rupture elongation of the adhesive sheet is 10% or more.

In the above aspect, it is preferable that the rupture elongation of the carbon nanotube sheet is larger than a rupture elongation of any other layer.

In the above aspect, it is preferable that a total thickness of the adhesive sheet is 10 μm or less.

In the above aspect, it is preferable that the carbon nanotube sheet and the adhesive agent layer are in contact with each other, and an adhesion inhibiting layer is provided on a surface of the carbon nanotube sheet opposite to a surface of the carbon nanotube sheet in contact with the adhesive agent layer.

In the above aspect, it is preferable that an adhesion inhibiting layer is provided between the carbon nanotube sheet and the adhesive agent layer.

In the above aspect, it is preferable that the carbon nanotubes of the carbon nanotube sheet are bundled into a form of fibers with an average diameter in a range from 1 μm to 300 μm.

In the above aspect, it is preferable that the carbon nanotube sheet has been exposed to steam or particles of a room-temperature liquid substance.

In the above aspect, it is preferable that the carbon nanotube sheet is complexed with an additional compound by at least one method selected from the group consisting of deposition, CVD, sputtering, molecular beam epitaxy, ion-plating, liquid-infiltration, electroplating, electroless plating, steam spraying, aerosol spraying and inkjet printing.

In the above aspect, it is preferable that a mass ratio between the carbon nanotube sheet and the additional compound in the complexed carbon nanotube sheet is in a range from 0.5:99.5 to 5:95.

The above aspect(s) of the invention provides a strong adhesive sheet including a thinned base.

BRIEF DESCRIPTION OF DRAWING(S)

DESCRIPTION OF EMBODIMENT(S)

Adhesive Sheet

Figure 1:
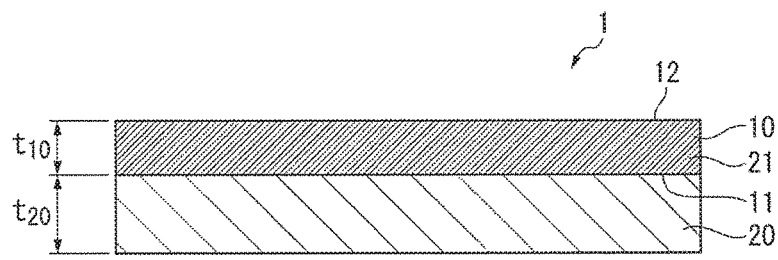
FIG. 1 is a sectional view showing an adhesive sheet according to an exemplary embodiment of the invention.

As shown in FIG. 1, an adhesive sheet 1 according to an exemplary embodiment includes a carbon nanotube sheet 10 and an adhesive agent layer 20 containing an adhesive agent. In the adhesive sheet 1 according to the exemplary embodiment, a first surface 11 (hereinafter, occasionally referred to as "first sheet surface 11") of the carbon nanotube sheet 10 is in contact with a first surface 21 (hereinafter, occasionally referred to as "first adhesive surface 21") of the adhesive agent layer 20.

In the adhesive sheet 1 according to the exemplary embodiment, the carbon nanotube sheet 10 functions as a base sheet. Specifically, since the adhesive agent layer 20 is unlikely to maintain a sheet shape by itself, for instance, when the adhesive sheet 1 is stored, transported or used, the carbon nanotube sheet 10 is configured to function as a reinforcing material for the adhesive sheet 1.

A rupture elongation of the adhesive sheet 1 is 10% or more. When the adhesive sheet 1 includes the carbon nanotube sheet 10 and the adhesive agent layer 20 laminated on the carbon nanotube sheet 10 and the rupture elongation is 10% or more, the adhesive sheet 1 should be sufficiently strong. The rupture elongation of the adhesive sheet 1 is preferably 50% or more, and more preferably 100% or more. When the adhesive sheet 1 includes the carbon nanotube sheet 10 in combination with the adhesive agent layer 20, the rupture elongation is significantly increased as compared with the case where the adhesive sheet 1 includes the carbon nanotube sheet 1 alone. This should be because the carbon nanotube sheet 1, unlike a typical resin film or the like, is not formed of bonded substances. Specifically, when pulled, the carbon nanotube sheet 1 is not ruptured with a force concentrated on one point, though the carbon nanotubes are separated from one another all over the sheet.

The upper limit of the rupture elongation of the adhesive sheet is not particularly determined, but is preferably 800% or less and more preferably 500% or less in terms of, for instance, prevention of deformation during a cutting process or the like.

It should be noted that rupture elongation herein means a value of elongation, which is measured when the carbon nanotube sheet is pulled in an alignment direction of the carbon nanotubs according to a test method of JIS Z0237:2009-8.

A total thickness of the adhesive sheet 1 is preferably 10 μm or less. When the total thickness of the adhesive sheet 1 is 10 μm or less, the adhesive sheet 1 is suitably usable as, for instance, a sealing material and a fixing material for a device with a fine structure. A total thickness of the adhesive sheet is preferably 8 μm or less and more preferably 6 μm or less.

It should be noted that when the adhesive sheet is provided with a release layer, the total thickness of the adhesive sheet does not include a thickness of the release layer.

In the adhesive sheet 1, in order to prevent a second surface 12 (hereinafter occasionally referred to as "second sheet surface 12") of the carbon nanotube sheet 10, which is opposite to the surface (first sheet surface 11) in contact with the adhesive agent layer 20, from adhering to an unintended place, the second sheet surface 12 of the carbon nanotube sheet 10 is preferably not adhesive. Accordingly, the adhesive agent of the adhesive agent layer 20 is preferably prevented from exuding onto the second sheet surface 12 of the carbon nanotube sheet 10.

Carbon Nanotube Sheet

The carbon nanotube sheet 10 includes a plurality of carbon nanotubes that are preferentially aligned in one direction defined in a plane of the sheet.

It should be noted that "the carbon nanotubes are aligned in a direction defined in a plane of the sheet" herein means that the carbon nanotubes are aligned along a direction defined in a plane of the sheet. For instance, the longitudinal axes of the carbon nanotubes are aligned in parallel with a direction defined in a plane of the sheet.

Further, "carbon nanotubes are preferentially aligned" herein means that the majority of the carbon nanotubes are aligned in the above manner. For instance, as long as the majority of the carbon nanotubes are aligned with the longitudinal axes thereof being in parallel with a direction defined in a plane of the sheet, a part of the carbon nanotubes may be aligned with the longitudinal axes thereof not in parallel with the direction defined in the plane of the sheet.

The carbon nanotube sheet 10 is produced by, for instance, drawing carbon nanotubes agglomerated by an intermolecular force into a sheet from a carbon nanotube forest (i.e., a grown form, which is occasionally referred to as "array", of a plurality of carbon nanotubes grown on a substrate to be vertically aligned relative to the substrate) and separating the drawn carbon nanotubes from the substrate.

The rupture elongation of the carbon nanotube sheet 10, which is measured according to JIS Z0237:2009-8, is preferably larger than that of any other layer (i.e., the adhesive agent layer and any other layer).

When rupture elongation of the carbon nanotube sheet 10 is larger than that of any other layer, the total thickness of adhesive sheet can be reduced without using an additional material with a large rupture elongation.

The carbon nanotube sheet 10 preferably has a structure where the carbon nanotubes are bundled into the form of fibers. When the carbon nanotube sheet has the above structure, the rupture elongation of the adhesive sheet can be increased. When the carbon nanotube sheet 10 is manufactured, for instance, by drawing carbon nanotubes from a forest, the carbon nanotube sheet contains the carbon nanotubes evenly distributed over the carbon nanotube sheet while being aligned in one direction defined in a plane of the sheet. As described later, when such a carbon nanotube sheet is exposed to steam or the like in a free-standing (self-supported) state, the carbon nanotubes, which are evenly distributed over the carbon nanotube sheet, locally form into fine bundles to provide the structure where the carbon nanotubes are bundled into the form of fibers. Further, as described later, a string body formed by twisting the carbon nanotube sheet 10 into a string has a structure where the carbon nanotubes are bundled into the form of fibers, and a lot of thus-obtained string bodies are arranged so that the carbon nanotube sheet 10 has the structure where the carbon nanotubes are gathered into the form of fibers.

An average diameter of the structure where the carbon nanotubes are bundled into the form of fibers is preferably in a range from 1 μm to 300 μm, more preferably in a range from 3 μm to 150 μm, and further preferably in a range from 5 μm to 50 μm.

It should be noted that the average diameter of the structure where the carbon nanotubes are bundled into the form of fibers herein means an average diameter of the outer circumference(s) of the structure(s).

The carbon nanotube sheet 10 is preferably subjected to a densification process. When the carbon nanotube sheet 10 is subjected to the densification process, the rupture elongation of the adhesive sheet can also be increased.

The "densification process" herein means a process for bundling the carbon nanotube sheet 10 (a plurality of adjacent ones of the carbon nanotubes of the carbon nanotube sheet 10 are bundled) and/or a process for increasing a presence density of the carbon nanotubes in a thickness direction.

The carbon nanotube sheet 10 may be subjected to the densification process, preferably the bundling process, so that the carbon nanotube sheet 10 has the structure where the carbon nanotubes are bundled into the form of fibers.

Examples of the densification process include: a bundling process where the carbon nanotube sheet in the free-standing state is exposed to steam of a room-temperature liquid substance (e.g., water, alcohols such as ethanol, methanol and isopropylalcohol, ketones such as acetone and methyl ethyl ketone, and esters such as ethyl acetate); and a bundling process where the carbon nanotube sheet 10 in the free-standing state is exposed to particles of a room-temperature liquid substance (aerosol). Further, the presence density of the carbon nanotubes may be increased in a thickness direction by: sticking the carbon nanotube sheet to another sheet such as a release sheet; immersing the carbon nanotube sheet in a room-temperature liquid substance or spraying the room-temperature liquid substance onto the carbon nanotube sheet so that the carbon nanotube sheet is in contact with the room-temperature liquid substance; and drying the carbon nanotube sheet. For the bundling process using particles of a room-temperature liquid substance, a diameter of the particles of the room-temperature liquid is preferably in a range from 5 nm to 200 µm, more preferably in a range from 7.5 nm to 100 µm, and further preferably in a range from 10 nm to 50 µm.

The carbon nanotube sheet 10 may be a sheet having the structure where the carbon nanotubes are bundled into the form of fibers, which is manufactured by arranging a lot of the string bodies into the form of sheet, the string bodies each being formed by twisting the carbon nanotube sheet. When the carbon nanotube sheet 10 is the sheet manufactured by arranging a lot of string bodies into the form of sheet, the rupture elongation of the adhesive sheet 1 can be increased.

The carbon nanotube sheet 10 may be a laminate including a plurality of laminated sheets manufactured by drawing the carbon nanotubes from the forest. When the carbon nanotube sheet 10 is in the form of such a laminate, the rupture elongation of the adhesive sheet 1 can be increased. Further, the adhesive agent of the adhesive agent layer 20 is easily prevented from exuding onto the surface of the carbon nanotube sheet 10. In this case, the carbon nanotube sheet 10 may be provided by laminating a plurality of the carbon nanotube sheets 10 having been subjected to the densification process or may be provided by laminating a plurality of sheets manufactured by drawing the carbon nanotubes from the forest and subjecting the laminated sheets to the densification process. Alternatively, a plurality of carbon nanotube sheets 10 having been subjected to the densification process may be laminated and further subjected to the densification process.

The carbon nanotube sheet may be complexed with an additional compound (hereinafter, occasionally referred to as "guest compound") by at least one method selected from the group consisting of deposition, CVD, sputtering, molecular beam epitaxy, ion-plating, liquid-infiltration, electroplating, electroless plating, steam spraying, aerosol spraying and inkjet printing.

When the carbon nanotube sheet is complexed with an additional compound, the strength of the adhesive sheet can be enhanced, and the adhesive sheet can be provided with characteristics originating from the additional compound. Further, the rupture elongation of the adhesive sheet can be increased.

Examples of the guest compound complexed with the carbon nanotube sheet include metals (e.g., nickel and copper), metal oxides (e.g., titanium oxide and alumina), non-metallic inorganic substances (e.g., silicon), and reactants of the non-metallic inorganic substances with carbon, nitrogen or the like.

For the complexed carbon nanotube sheet, a mass ratio between the carbon nanotube sheet and the guest compound is preferably in a range from 0.5:99.5 to 5:95. When the mass ratio is in the above range, the complexed carbon nanotube sheet can be provided with characteristics originating from the guest compound while the adhesive sheet can maintain the strong mechanical properties. The mass ratio between the carbon nanotube sheet and the guest compound is more preferably in a range from 0.5:99.5 to 3:97 and further preferably in a range from 1:99 to 2:98.

A thickness of the carbon nanotube sheet 10 is appropriately determined depending on the intended use of the adhesive sheet 1. For instance, in order to keep the adhesive sheet thin as a whole while preventing the adhesive agent from exuding onto a back side of the carbon nanotube sheet (i.e., the second sheet surface 12), a thickness $t_{10}$ of the carbon nanotube sheet 10 (see FIG. 1) is preferably in a range from 10 nm to 3 µm and more preferably in a range from 50 nm to 2 µm. Especially, as compared with the carbon nanotube sheet with a thickness of 2 µm or less, a base sheet with a like thickness made of a typical material such as a resin film is unlikely to make the adhesive sheet strong. Accordingly, the adhesive sheet of the exemplary embodiment is suitable for use requiring a thinned base sheet.

Adhesive Agent Layer

The adhesive agent of the adhesive agent layer 20 is not particularly limited. Examples of the adhesive agent include acrylic adhesive, urethane adhesive, rubber adhesive, polyester adhesive, silicone adhesive and polyvinylether adhesive. Among the above, the adhesive agent of the adhesive agent layer 20 is preferably at least one selected from the group consisting of acrylic adhesive, urethane adhesive and rubber adhesive, and more preferably an acrylic adhesive.

Examples of an acrylic adhesive include a polymer having a repeating unit derived from alkyl(meth)acrylate containing a straight or branched alkyl group and an acrylic polymer having a repeating unit derived from (meth)acrylate with a cyclic structure. It should be noted that "(meth)acrylate" includes "acrylate" and "methacrylate" and the same applies to the other similar terms.

When the acrylic polymer is a copolymer, the type of the copolymer is not particularly limited. The acrylic copolymer may be a block copolymer, a random copolymer or a graft copolymer.

Among the above, an acrylic copolymer having a repeating unit (a1) derived from an alkyl(meth)acrylate containing an alkyl group having 1 to 20 carbon atoms (a1') (hereinafter, also referred to as "monomer component (a1')") and an acrylic copolymer having a repeating unit (a2) derived from a functional-group-containing monomer (a2') (hereinafter, also referred to as "monomer component (a2')") are preferable as the acrylic adhesive used in the exemplary embodiment.

It should be noted that the acrylic copolymer may further have a repeating unit (a3) derived from another monomer component (a3') different from the monomer component (a1') and the monomer component (a2').

The alkyl group in the monomer component (a1') preferably has 1 to 12 carbon atoms, more preferably has 4 to 8 carbon atoms, and further preferably has 4 to 6 carbon atoms in terms of enhancement of the adherability. Examples of the monomer component (a1') include methyl(meth)acrylate, ethyl(meth)acrylate, propyl(meth)acrylate, n-butyl(meth)acrylate, 2-ethylhexyl(meth)acrylate, lauryl(meth)acrylate, tridecyl(meth)acrylate and stearyl(meth)acrylate. Among the above examples of the monomer component (a1'), butyl(meth)acrylate and 2-ethylhexyl(meth)acrylate are preferable, and butyl(meth)acrylate are more preferable.

The content of the repeating unit (a1) is preferably in a range from 50 mass % to 99.5 mass % of the total repeating units of the acrylic copolymer (100 mass %), more preferably in a range from 55 mass % to 99 mass %, further preferably in a range from 60 mass % to 97 mass %, and still more preferably in a range from 65 mass % to 95 mass %.

Examples of the monomer component (a2') include a hydroxy-group-containing monomer, carboxy-group-containing monomer, epoxy-group-containing monomer, amino-group-containing monomer, cyano-group-containing monomer, keto-group-containing monomer, and alkoxysilyl-group-containing monomer. Among the above examples of the monomer component (a2'), a hydroxy-group-containing monomer and a carboxy-group-containing monomer are preferable.

Examples of the hydroxy-group-containing monomer include 2-hydroxyethyl(meth)acrylate, 2-hydroxylpropyl (meth)acrylate, 2-hydroxybutyl(meth)acrylate, 3-hydroxybutyl(meth)acrylate and 4-hydroxybutyl(meth)acrylate, among which 2-hydroxyethyl(meth)acrylate is preferable.

Examples of the carboxy-group-containing monomer include a (meth)acrylic acid, maleic acid, fumaric acid and itaconic acid, among which a (meth)acrylic acid is preferable.

Examples of the epoxy-group-containing monomer include glycidyl(meth)acrylate. Examples of the amino-group-containing monomer include diaminoethyl(meth) acrylate. Examples of the cyano-group-containing monomer include acrylonitrile.

The content of the repeating unit (a2) is preferably in a range from 0.1 mass % to 50 mass % of the total repeating units of the acrylic copolymer (100 mass %), more preferably in a range from 0.5 mass % to 40 mass %, further preferably in a range from 1.0 mass % to 30 mass %, and still more preferably in a range from 1.5 mass % to 20 mass %.

Examples of the monomer component (a3') include: (meth)acrylates having a cyclic structure such as cyclohexyl (meth)acrylate, benzyl(meth)acrylate, isobornyl(meth)acrylate, dicyclopentanyl(meth)acrylate, dicyclopentenyl(meth) acrylate, dicyclopentenyloxyethyl(meth)acrylate, imide (meth)acrylate and acryloylmorpholine; vinyl acetate; and styrene.

The content of the repeating unit (a3) is preferably in a range from 0 mass % to 40 mass % of the total repeating units of the acrylic copolymer (100 mass %), more preferably in a range from 0 mass % to 30 mass %, further preferably in a range from 0 mass % to 25 mass %, and still more preferably in a range from 0 mass % to 20 mass %.

It should be noted that one of the above monomer components (a1') may be singularly used or two or more thereof may be used in combination, one of the above monomer components (a2') may be singularly used or two or more thereof may be used in combination, and one of the above monomer components (a3') may be singularly used or two or more thereof may be used in combination.

The acrylic copolymer may be cross-linked. A cross linker may be a known epoxy cross-linker, isocyanate cross-linker, aziridine cross-linker or metal chelate cross-linker. In order to cross-link the acrylic copolymer, the functional group derived from the monomer component (a2') may be used as a cross-linking point where the acrylic copolymer is reacted with the cross-linker.

The composition for forming the adhesive agent layer 20 may contain additional component(s) as long as the effect(s) of the invention is not impaired. Examples of the additional component(s) to be contained in the composition for forming the adhesive agent layer include organic solvent, flame retardant, tackifier, ultraviolet absorber, antioxidant, preservative, antifungal agent, plasticizer, antifoaming agent and wettability modifier.

A thickness of the adhesive agent layer 20 is appropriately determined depending on the intended use of the adhesive sheet 1. A thickness $t_{20}$ of the adhesive agent layer 20 (see FIG. 1) on the first sheet surface 11 of the carbon nanotube sheet 10 is usually adjusted in a range from 3 μm to 150 μm and preferably in a range from 5 μm to 100 μm. However, for instance, in order to achieve a sufficient adherability while reducing the total thickness of the adhesive sheet, $t_{20}$ is preferably in a range from 1 μm to 20 μm and more preferably in a range from 2 μm to 9 μm.

Manufacturing Method of Adhesive Sheet

A manufacturing method of the adhesive sheet 1 is not particularly limited.

For instance, the adhesive sheet 1 may be manufactured through the following process.

A forest of carbon nanotubes is first formed on a substrate such as a silicon wafer by a known method. Subsequently, an end of the forest is twisted and drawn with tweezers or the like to be separated from the substrate. A carbon nanotube sheet is thus manufactured. The manufactured carbon nanotube sheet is subjected to a densification process as needed.

An adhesive agent layer is manufactured independently of the carbon nanotube sheet. The adhesive agent is first applied on a release sheet to form a coating film. The coating film is then dried to form the adhesive agent layer.

A surface of the carbon nanotube sheet is stuck on a surface of the adhesive agent layer. Subsequently, the release sheet is removed to provide the adhesive sheet 1.

A typical adhesive sheet usually includes a base sheet made of paper or resin film (e.g., polyolefin resin, polyester resin, polyimide resin, polycarbonate resin, polyurethane resin, polyvinyl chloride and acrylic resin). However, such a base sheet made of paper or resin film lowers the strength of the adhesive sheet when thinned.

The adhesive sheet 1 of the exemplary embodiment is in the form of a laminate of the adhesive agent layer 20 and the carbon nanotube sheet 10. Since the carbon nanotube sheet 10 functions as a base, the strength of the adhesive sheet 1 can be increased while the base is thinned. The adhesive sheet 1 of the exemplary embodiment includes the thinned base, so that the thickness of the adhesive agent layer 20 can be appropriately adjusted to provide a high adherability to the adhesive sheet.

Modifications of Exemplary Embodiment(s)

The scope of the invention is not limited to the above-described exemplary embodiment(s) but includes modifications and improvements compatible with the invention. It should be noted that the like reference signs are attached to the same members and the like as those of the first exemplary embodiment and explanation thereof is omitted or simplified hereinbelow.

For instance, the adhesive sheet may include a release layer laminated on a surface of at least one of the carbon nanotube sheet 10 and the adhesive agent layer 20.

Figure 2:
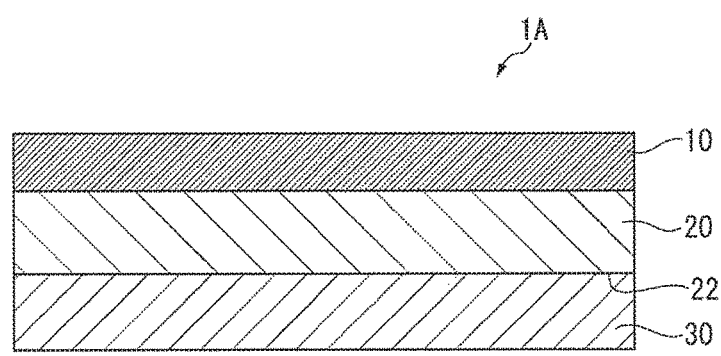
FIG. 2 is a sectional view showing an adhesive sheet according to another exemplary embodiment of the invention.

As shown in FIG. 2, an adhesive sheet 1A includes a release layer 30 laminated on a second surface 22 (hereinafter, occasionally referred to as "second adhesive surface 22") of the adhesive agent layer 20 of the adhesive sheet 1 of the exemplary embodiment.

The release layer 30 is not particularly limited. For instance, in terms of easy handling, the release layer 30 preferably includes a release base and a release agent layer provided by applying a release agent on the release base. The release layer 30 may include a release agent applied on one surface of the release base or may include a release agent applied on both surfaces of the release base. The release base may be a paper base, a laminate paper including the paper base and a thermoplastic resin such as polyethylene laminated on the paper base, or a plastic film. Examples of the paper base include glassine paper, coated paper and cast coated paper. Examples of the plastic film include polyester films such as polyethylene terephthalate, polybutylene terephthalate and polyethylene naphthalate, and polyolefin films such as polypropylene and polyethylene. Examples of the release agent include an olefin rein, rubber elastomer (e.g., butadiene resin and isoprene resin), long-chain alkyl resin, alkyd resin, fluorine resin and silicone resin.

A thickness of the release layer 30 is not particularly limited. The thickness of the release layer 30 is usually in a range from 20 μm to 200 μm and is preferably in a range from 25 μm to 150 μm.

A thickness of the release agent layer is not particularly limited. When the release agent layer is provided by applying a solution containing the release agent, the thickness of the release agent layer is preferably in a range from 0.01 μm to 2.0 μm and more preferably in a range from 0.03 μm to 1.0 μm.

When the plastic film is used as the release base, a thickness of the plastic film is preferably in a range from 3 μm to 50 μm and more preferably in a range from 5 μm to 40 μm.

For instance, the carbon nanotube sheet 10 and the adhesive agent layer 20 may be in contact with each other and the adhesive sheet may include an adhesion inhibiting layer provided on the second sheet surface 12 of the carbon nanotube sheet 10.

Figure 3:
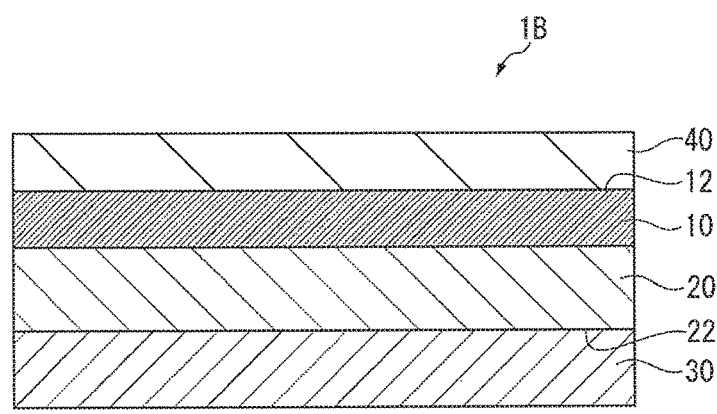
FIG. 3 is a sectional view showing an adhesive sheet according to still another exemplary embodiment of the invention.

As shown in FIG. 3, an adhesive sheet 1B includes an adhesion inhibiting layer 40 laminated on the second sheet surface 12 of the carbon nanotube sheet 10 and the release layer 30 laminated on the second adhesive surface 22 of the adhesive agent layer. In the adhesive sheet 1B, the adhesion inhibiting layer 40 prevents the carbon nanotube sheet 10 from adhering to an unintended place. The adhesion inhibiting layer 40 also functions as a protection layer for the carbon nanotube sheet 10.

Further, the adhesion inhibiting layer 40 increases the rupture elongation of the adhesive sheet 1B.

In the adhesive sheet 1B, the release layer 30 may be the same as the above release layer.

A composition for forming the adhesion inhibiting layer 40 may be paper, a resin film, a cured product of an ultraviolet-curable resin, or a metal foil.

A thickness of the adhesion inhibiting layer 40 is not particularly limited, but is preferably in a range from 1 μm to 10 μm and more preferably in a range from 1 μm to 5 μm.

It should be noted that when the adhesive sheet is provided with the adhesion inhibiting layer, the total thickness of the adhesive sheet does not include a thickness of the adhesion inhibiting layer.

For instance, the adhesion sheet may include an adhesion inhibiting layer provided between the carbon nanotube sheet 10 and the adhesive agent layer 20.

Figure 4:
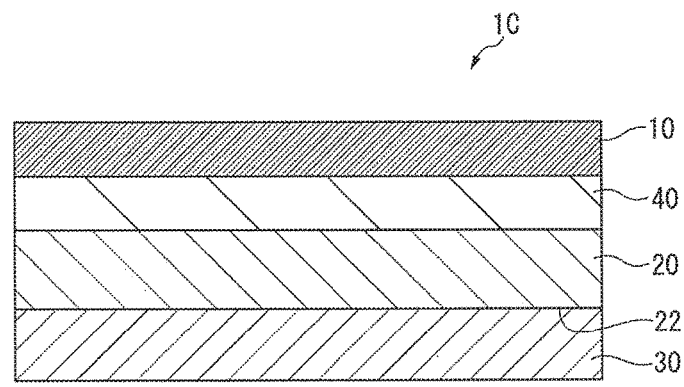
FIG. 4 is a sectional view showing an adhesive sheet according to yet another exemplary embodiment of the invention.

As shown in FIG. 4, an adhesive sheet 1C includes the adhesion inhibiting layer 40 provided between the carbon nanotube sheet 10 and the adhesive agent layer 20 and the release layer 30 laminated on the second adhesive surface 22 of the adhesive agent layer. In the adhesive sheet 1C, the adhesion inhibiting layer 40 prevents the adhesive agent of the adhesive agent layer 20 from exuding onto the carbon nanotube sheet 10 and thus prevents the carbon nanotube sheet 10 from adhering to an unintended place.

Since the adhesive sheet 1C includes the adhesion inhibiting layer 40 provided between the carbon nanotube sheet 10 and the adhesive agent layer 20, the adherability can be easily adjusted in the above range. Further, the rupture elongation of the adhesive sheet 1C can be increased.

In the adhesive sheet 1C, the release layer 30 and the adhesion inhibiting layer 40 may be the same as the above like elements. A composition for forming the adhesion inhibiting layer may be an adhesive agent layer that is less adhesive than the adhesive agent layer 20.

The adhesive sheet 1C may include another release layer 30 provided on the second surface of the carbon nanotube sheet 10.

For instance, the adhesive agent of the adhesive agent layer 20 of the adhesive sheet may exude through the carbon nanotube sheet 10 onto the surface of the carbon nanotube sheet 10. When the adhesive agent of the adhesive agent layer 20 exudes onto the surface of the carbon nanotube sheet 10, the adhesive sheet functions as a double-sided adhesive sheet. Further, the second sheet surface 12 of the carbon nanotube sheet 10 may be provided with an adhesive agent layer independent of the adhesive agent layer 20. In this case, the adhesive agent of the adhesive agent layer 20 may not exude or may exude onto the second sheet surface 12 of the carbon nanotube sheet 10.

As described above, the adhesive sheet may be used as a single-sided adhesive sheet or a double-sided adhesive sheet depending on an intended use. When the carbon nanotube sheet 10 is complexed with the guest compound, an added amount of the guest compound may be adjusted to adjust an exuding amount of the adhesive agent. The tack of the surface of the carbon nanotube sheet 10 can thus be controlled to design the adhesive sheet as a single-sided adhesive sheet or a double-sided adhesive sheet as needed.

EXAMPLE(S)

The invention will be described in further detail with reference to Example(s). The invention is, however, by no means limited by Example(s).

Example 1

Manufacturing of Carbon Nanotube Sheet
Preparation of Carbon Nanotube Forest

Using thermal chemical vapor deposition (CVD) equipment including three furnaces and using argon gas as a carrier gas and acetylene as a carbon source, a carbon nanotube forest was formed on a divided six-inch silicon wafer by catalytic chemical vapor deposition. A height of the carbon nanotube forest was 300 μm.

Formation of Carbon Nanotube Sheet

An end of the carbon nanotube forest was twisted and drawn with tweezers into a carbon nanotube sheet. The carbon nanotube sheet was held on two parallel support sticks (copper sticks with a 2-mm diameter) with the assistance of the self-adhesiveness of the sheet, and an unnecessary part was cut off. A free-standing (self-supported) carbon nanotube sheet held between the two support sticks was thus obtained. The carbon nanotube sheet was then remounted on a surface of a release layer, i.e., a release sheet (a 25-μm-thick tetrafluoroethylene-hexafluoropropylene copolymer film, manufactured by AIRTECH, A4000W). On the carbon nanotube sheet on the release sheet (the release layer), another free-standing carbon nanotube sheet held between two support sticks, which was independently prepared, was laminated. The above process (lamination) was repeated to provide a multilayer carbon nanotube sheet including five laminated carbon nanotube sheets. Isopropylalcohol was sprayed to the multilayer carbon nanotube sheet and left until spontaneously vaporizing, thereby densifying the multilayer carbon nanotube sheet. A thickness of the densified multilayer carbon nanotube sheet was 0.2 µm.

Manufacturing of Adhesive Agent Layer

A coating liquid was prepared by copolymerizing 2-ethylhexyl acrylate (40 parts by mass), vinyl acetate (40 parts by mass) and 2-hydroxyethyl acrylate (20 parts by mass) to prepare 100 parts by mass (hereinafter, solid ratio) of a solution of an acrylic copolymer (average molecular weight: 700,000, glass transition temperature: minus 60 degrees C., concentration: 40 mass %), adding 1 part by mass of BHS8515 (manufactured by TOYOCHEM, CO., LTD.) as a cross-linker to the solution, and mixing together.

The above coating liquid was applied on one surface of the release layer, i.e., the release sheet (manufactured by LINTEC Corporation, SP-PET381031), using a knife coater to make an 8-µm-thick adhesive agent layer.

Manufacturing of Adhesive Sheet

An exposed surface of the multilayer carbon nanotube sheet (a surface opposite to the surface in contact with the release sheet as the release layer) was stuck on an exposed surface of the adhesive agent layer (a surface opposite to the surface in contact with the release sheet as the release layer) to provide an adhesive sheet with the release layer. The total thickness of the adhesive sheet excluding the thickness of the release layer was 8.2 µm.

Comparative Example 1

Manufacturing of PMMA Film

A polymethyl methacrylate (PMMA) resin (manufactured by Sigma-Aldrich Co. LLC., average molecular weight: 150,000) dissolved in a solvent, i.e., a mixed solvent of acetic ether and toluene (mass ratio between acetic ether and toluene: 50:50), was applied to a smooth surface of a release sheet (manufactured by TOYOBO, CO., LTD. PET50A-4100) and dried, thereby obtaining a 0.2-µm-thick PMMA film.

Manufacturing of Adhesive Agent Layer

An adhesive agent layer was manufactured in the same manner as in Example 1.

Manufacturing of Adhesive Sheet

An exposed surface of the PMMA film (a surface opposite to the surface in contact with the release sheet) was stuck on an exposed surface of the adhesive agent layer, and then the release sheet laminated on the PMMA film was removed, thereby obtaining an adhesive sheet. The total thickness of the adhesive sheet was 8.2 µm.

Measurement of Rupture Elongation of Adhesive Sheet

The adhesive sheets obtained in Example 1 and Comparative Example 1 were each cut into a 24-mm-wide rectangular test piece, and pulled in a drawing direction of the carbon nanotube sheet to measure the resulting elongation according to JIS Z0237:2009-8. Table 1 shows the results.

TABLE 1

|  | Rupture Elongation (%) |
| --- | --- |
| Example 1 | 200 |
| Comparative Example 1 | 5 |

As shown in Table 1, it has been demonstrated that the strength of the adhesive sheet of Example 1 is increased as compared with the adhesive sheet of Comparative Example 1 though these adhesive sheets have the same thickness.

The invention claimed is:

1. An adhesive sheet comprising:
a carbon nanotube sheet comprising a plurality of carbon nanotubes aligned preferentially in one direction within a plane of the sheet; and
an adhesive agent layer comprising an adhesive agent, wherein
the carbon nanotube sheet comprises a structure in which string bodies are gathered into a form of fibers, and average diameter of the structure being a range from 1 µm to 300 µm, the string bodies being arranged into a form of a sheet,
a rupture elongation of the adhesive sheet is 10% or more and 800% or less, the rupture elongation being measured in accordance with JIS Z0237:2009-8, and
the carbon nanotube sheet and the adhesive agent layer are stacked together.

2. The adhesive sheet according to claim 1, wherein the rupture elongation of the carbon nanotube sheet is larger than a rupture elongation of any other layer.

3. The adhesive sheet according to claim 1, wherein a total thickness of the adhesive sheet is 10 µm or less.

4. The adhesive sheet according to claim 1, wherein
the carbon nanotube sheet and the adhesive agent layer are in contact with each other, and
an adhesion inhibiting layer is provided on a surface of the carbon nanotube sheet opposite to a surface of the carbon nanotube sheet in contact with the adhesive agent layer.

5. The adhesive sheet according to claim 1, wherein an adhesion inhibiting layer is provided between the carbon nanotube sheet and the adhesive agent layer.

6. The adhesive sheet according to claim 1, wherein the carbon nanotube sheet has been exposed to steam or particles of a room-temperature liquid substance.

7. The adhesive sheet according to claim 1, wherein the carbon nanotube sheet is complexed with an additional compound by at least one method selected from the group consisting of deposition, CVD, sputtering, molecular beam epitaxy, ion-plating, liquid-infiltration, electroplating, electroless plating, steam spraying, aerosol spraying and inkjet printing.

8. The adhesive sheet according to claim 7, wherein a mass ratio between the carbon nanotube sheet and the additional compound in the complexed carbon nanotube sheet is in a range from 0.5:99.5 to 5:95.

* * * * *